May 8, 1962 E. DURBIN ET AL 3,034,119
AUTOMATIC GAIN CONTROL SYSTEM
Filed April 22, 1958
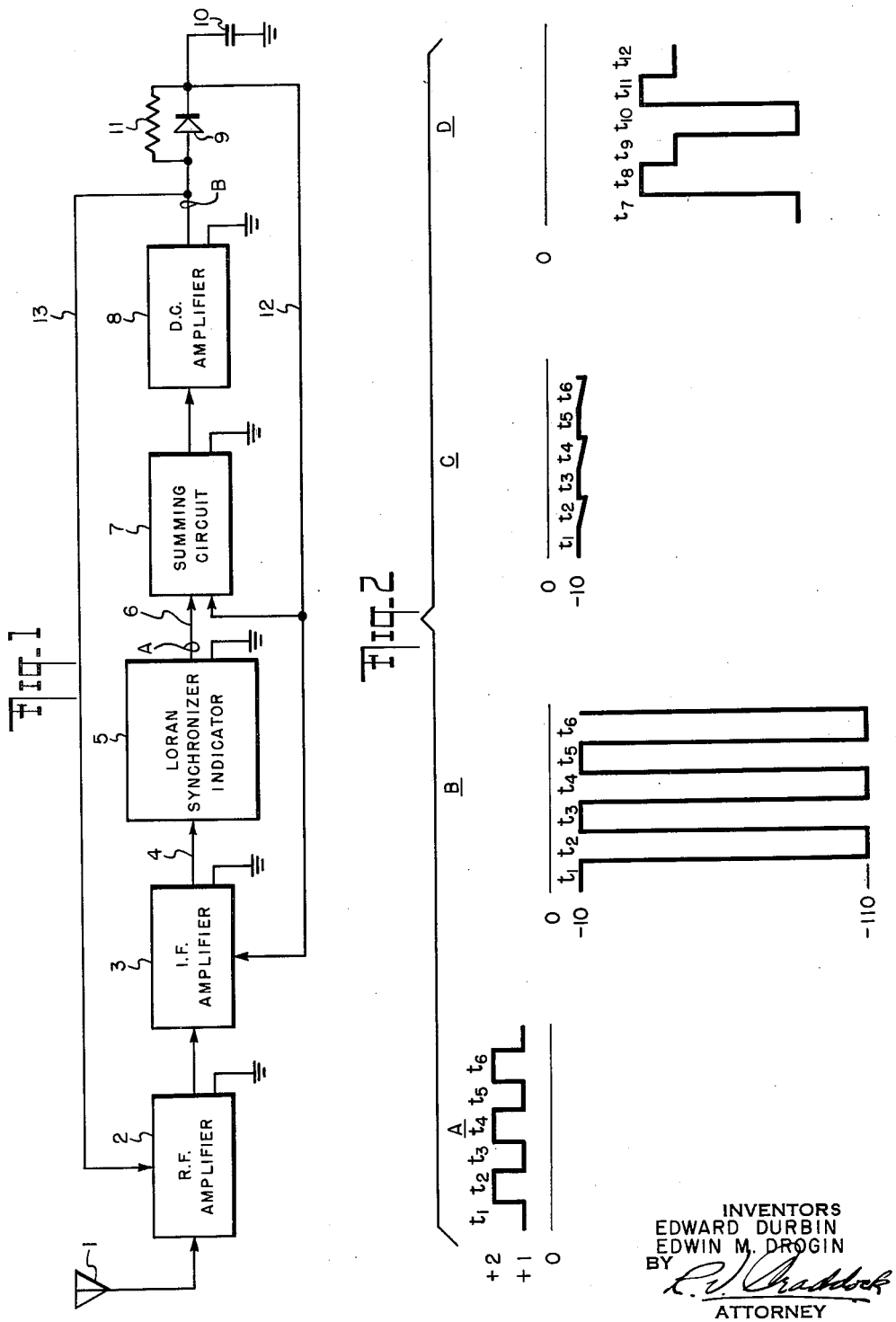
INVENTORS
EDWARD DURBIN
EDWIN M. DROGIN
BY
ATTORNEY

United States Patent Office 3,034,119
Patented May 8, 1962

3,034,119
AUTOMATIC GAIN CONTROL SYSTEM
Edward Durbin, Cedarhurst, and Edwin M. Drogin, Bellerose, N.Y., assignors to Sperry Rand Corporation, a corporation of Delaware
Filed Apr. 22, 1958, Ser. No. 730,144
4 Claims. (Cl. 343—103)

The present invention relates to automatic gain control systems and more particularly to an automatic gain control system for use in a loran type receiver.

As is well understood, the function of a receiver for use in a loran system is to measure the time difference intervening the receptions of a corresponding pair of pulses which are respectively transmitted by the master and slave transmitters. The time separation between the master and slave pulses at the loran receiver is a function of the location of the receiver within the service area of the loran system. By measuring the time intervening the receptions of a corresponding pair of master and slave pulses, a hyperbolic line of position is established along which the receiver is located.

The loran receiver, being carried on board a mobile craft, is generally separated by different distances from the master and slave transmitters. Consequently, the amplitudes of the master and slave pulses as received are mutually different in accordance with the corresponding distances between the receiver and the respective transmitters.

The conventional technique employed in making a time difference measurement at the loran receiver involves a superpositioning of the leading edges of the master and slave pulses on a cathode ray tube indicator which is an integral part of the loran receiver. In order that the superpositioning of the viewed master and slave pulses may be made with precision, it is preferable that both the master and slave pulse amplitudes be made equal to some convenient value. To achieve such a result, the weaker one of the received master and slave pulses is so amplified that it will be displayed on the face of the cathode tube indicator with some convenient amplitude. Then, the gain of the loran receiver is automatically adjusted during the period that the stronger of the received master and slave pulses is received so that the stronger pulse is also presented on the cathode ray tube indicator with the same amplitude as that of the weaker pulse.

The master and slave pulses are always received in recurrent pairs at the loran receiver with the master pulse occupying a time interval distinct from the time interval of the slave pulse. Therefore, it is possible to selectively vary the gain of the loran receiver during the respective time intervals so as to produce equal amplitudes of master and slave pulses for pulse matching purposes. The weaker of the received master and slave pulses is amplified to some convenient level in accordance with an automatic gain control (AGC) voltage which is applied to the receiver I-F amplifiers. The stronger of the received master and slave pulses is made equal in amplitude to that of the displayed weaker pulse by means of an automatic amplitude balance control (AABC) voltage which is applied to the receiver R-F amplifiers.

The AGC and AABC control voltages are derived in the prior art from two locally produced D.C. voltages. The first of the two voltages is proportional in amplitude to the strength of a predetermined one of the received master or slave pulses while the second locally generated D.C. voltage is proportional in amplitude to the other of the received pulses. A switch is used to alternately apply the D.C. voltages to a common output terminal. The switch is driven synchronously with the time of reception of the master and slave pulses so that the appearance of the first and second D.C. voltages at the aforesaid output terminal is also synchronous with the reception of their respectively associated master and slave pulses. The signal appearing at the output terminal is a square wave whose amplitude is proportional to the difference in amplitude between the first and second D.C. voltages and whose phase is determined by the sense of the difference in amplitude between the first and second D.C. voltages.

It has been the practice in the prior art to directly apply the square wave voltage to the receiver R-F amplifier for automatic amplitude balance control purposes. The AGC voltage was heretofore derived from the square wave by means of additional circuit elements which produce a D.C. voltage equal to the less negative portion of the square wave (corresponding to the amplitude of the weaker of the received master and slave pulses) for application to the receiver I-F amplifier. The additional circuit elements comprise D.C. amplifiers and voltage clamping circuits.

Because of the fact that the loran receiver embodies more I-F amplifiers than R-F amplifiers, it has been the practice to amplify the AABC and AGC voltages by different factors. For example, the AABC voltage may be amplified by a factor ten times the factor of amplification utilized in the case of the AGC voltage.

It is the principal object of the present invention to provide an improved and simplified automatic gain control and automatic amplitude balance control circuit for use in loran type receivers.

Another object is to provide a nonlinear feedback amplifier having substantially different gain factors for applied alternating and direct current signals wherein the direct current gain is stabilized by negative feedback.

An additional object is to provide a nonlinear feedback amplifier for deriving automatic amplitude balance control and automatic gain control voltage for application in a loran receiver.

These and other objects of the present invention, as will be seen from a reading of the following specification, are achieved by the provision of a nonlinear feedback amplifier which is adapted in a preferred embodiment to receive a square wave voltage waveform having voltage extremities proportional in amplitude to the strength of respectively associated received master and slave pulses. A rectifying element is connected between the output of the feedback amplifier and the first terminal of a capacitor, the other terminal of which is connected to ground. The rectifying element is so poled as to be inversely biased by the signal appearing at the output of the feedback amplifier. Provision is made for the limited conduction of the rectifying element in a reverse direction so as to place a charge on the capacitor.

The charge which results on the capacitor from the limited flow of reverse current through the rectifying element is coupled back to the input of the feedback amplifier in a degenerative sense. The operation of the amplifier with feedback is such that the gain of the amplifier is substantially greater for input alternating signal components than for input direct current signal components. Thus, a higher amplitude alternating signal is available at the amplifier output for AABC purposes while a low amplitude direct current signal is available across the capacitor for AGC purposes. Additionally, the amplitude of the voltage across the capacitor is equal to a predetermined one of the voltage extremities of the alternating signal appearing at the output of feedback amplifier.

For a more complete understanding of the present invention, reference should be had to the following description and to the drawings of which:

FIG. 1 is a block diagram, partially schematic in form, of a preferred embodiment of the present invention adapted for use in a loran receiver.

FIG. 2 shows series of waveforms useful in explaining the operation of a nonlinear feedback amplifier used in FIG. 1.

In FIG. 1, recurrent pairs of master and slave transmitted pulses are received by antenna 1, amplified by R-F amplifier 2, and I-F amplifier 3, and applied via lead 4 to loran synchronizer-indicator 5. Loran synchronizer-indicator 5 may be conventional in form and comprises, for example, a major portion of the circuit elements disclosed in the sole FIGURE of U.S. Patent 2,728,908, issued on December 27, 1955, in the name of Wilbert P. Frantz, and assigned to the present assignee. More specifically, the circuit elements contained in loran synchronizer-indicator 5 are those shown in the sole figure of the aforesaid patent less receiver 12, dotted box 356, cathode follower 354, and amplifier 355. Lead 4 of FIG. 1 corresponds to the unidentified lead shown at the output of I-F amplifier 18 of the Frantz patent while lead 6 of FIG. 1 of the present application corresponds to the unidentified lead which is connected to the input of cathode follower 354 of the aforesaid patent.

The waveform of the signal present on lead of FIG. 1 is illustrated at A in FIG. 2. By inspection of waveform A of FIG. 2, it will be seen that the signal is in the form of a square wave having alternately recurring portions which vary between first and second D.C. levels, said D.C. levels being respectively, one and two volts above ground for illustrative purposes. The alternate portions of waveform A occurring during time interval $t_1$, $t_3$, and $t_5$ correspond to the amplitude of the weaker of the received master and slave pulses. The portions of waveform A occurring during time intervals $t_2$, $t_4$, and $t_6$ correspond to the amplitude of the stronger of the received master and slave pulses.

Waveform A, appearing on lead 6 of FIG. 1, is applied to a first input of summing circuit 7 whose output is connected to direct coupled (D.C.) amplifier 8. The output of D.C. amplifier 8 is connected through a rectifier 9 and a capacitor 10 to ground. Rectifier 9 is shunted by a resistor 11 which provides a high impedance path for the flow of charging current into capacitor 10, as will be more fully described later. Resistor 11 may be eliminated in cases where the normal reverse current flow of rectifier 9 is sufficient to charge capacitor 10. Such reverse current flow may be present where a semiconductive element is employed as rectifier 9 rather than vacuum tube diode, for example.

The signal appearing at the junction of rectifier 9 and capacitor 10 is fed back via lead 12 to a second input of summing circuit 7 and to I-F amplifier 3 for varying the gain of the latter. The signal appearing at the junction of D.C. amplifier 8 and rectifier 9 is applied via lead 13 to R-F amplifier 2 to vary the gain thereof for automatic amplitude balance control purposes.

To exemplify the operation of the nonlinear feedback amplifier comprising circuit 7, amplifier 8, rectifier 9, capacitor 10 and feedback lead 12, it is assumed that the A.C. gain of amplifier 8 (without feedback) for alternating input signals is 100. As previously mentioned, the alternating input signal, applied via lead 6, is the square wave signal A of FIG. 2, which alternates between the potential values of +1 and +2 volts with respect to ground. In the assumed case of the A.C. gain factor of 100, a signal is produced at the output of amplifier 8 such as is represented by waveform B of FIG. 2. It will be seen that the one volt peak-to-peak input signal A has been amplified to the 100-volt peak-to-peak output signal B of FIG. 2. For illustrative purposes, the output signal B is shown as varying between −10 and −110 volts. It should be observed, however, that the D.C. levels of the output signal are purely arbitrary and may be adjusted to suit convenience provided that rectifier 9 is correspondingly poled to be reversely biased thereby.

Inasmuch as the illustrative output signal B is negative with respect to ground, rectifier 9 is reversely biased. However, current will flow in the reverse direction through rectifier 9 (either because of its inherent characteristic or, alternatively, because of the high impedance shunting path of resistor 11) thus charging capacitor 10. Capacitor 10 will attempt to charge toward the full −110 volts during time intervals $t_2$, $t_4$, and $t_6$ as illustrated by waveform C of FIG. 2. Because of the high reverse conduction impedance of rectifier 9, however, capacitor 10 will only negligibly charge toward the −110 volts during any of the time intervals $t_2$, $t_4$, and $t_6$. In other words, the time constant of the charging circuit, represented by the reverse conduction impedance of rectifier 9 and the capacity of capacitor 10, is made large relative to the repetition interval of waveform A.

In the event that the charge across capacitor 10 during time intervals $t_2$, $t_4$, and $t_6$ should increase negatively beyond −10 volts, such increased voltage is immediately removed by the clamping action of rectifier 9 which conducts in the normal forward direction during time intervals $t_1$, $t_3$, and $t_5$ when waveform B assumes the value of −10 volts. In this way, the charge built up across capacitor 10 stabilizes at the value of the least negative portion of the square wave of signal B.

The essentially D.C. signal appearing across capacitor 10 is degeneratively combined with signal A in summing circuit 7. The result is that the gain of the feedback amplifier comprising summing circuit 7 and D.C. amplifier 8 is reduced and stabilized with respect to the D.C. component of input signal A which ultimately appears at an amplified value across capacitor 10. It will be noted, however, that the alternating signal component at the output of amplifier 8, having a repetition interval much less than the charging time constant of capacitor 10, does not appear on feedback lead 12. Consequently, there is essentially no degenerative feedback in the amplifier comprising summing circuit 7 and D.C. amplifier 8 with respect to such alternating signal component.

The amplified negative square wave B of FIG. 2 may be applied via lead 13 to R-F amplifier 2 for automatic amplitude balance control purposes. At the same time, an essentially D.C. voltage which is amplified to a lesser extent because of the D.C. feedback is available on lead 12 for application to I-F amplifier 3 for automatic gain control purposes. Additionally, the amplitude of the AGC voltage on lead 12 is automatically made equal to the less negative portion of the AABC signal which is available on lead 13.

It should be understood that the utility of the present invention is not limited to loran receivers which locally generate a square wave signal such as signal A of FIG. 2. Certain types of loran receivers locally generate analogous signals which are staircase in shape such as waveform D of FIG. 2. The three discrete voltage levels of waveform D respectively represent the received signal strength of the master, slave 1 and slave 2 pulses which are transmitted in recurrent groups at the basic repetition rate of the loran system. For example, the amplitude of waveform B during time intervals $t_7$ and $t_{10}$ may represent the received master pulse amplitude while the amplitudes during the recurring time intervals corresponding to $t_8$ and $t_9$ respectively represent the amplitude of received slave 1 and slave 2 pulses. Should a signal of the form of waveform D appear at the output of D.C. amplifier 8 of FIG. 1, then also in that case the charge developed across capacitor 10 will follow the value of the least negative portion thereof and the operation of the feedback amplifier will be as described above.

Although the illustrative waveforms A and B of FIG. 2 show that a phase inversion has taken place in amplifier 8 of FIG. 1, it will be recognized that such phase inversion is not material to the operation of the invention.

The only requirement is that the feedback signal (appearing across capacitor 10) be degeneratively combined with the input signal applied to amplifier 8.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a receiver including first and second amplifiers, means for automatically controlling the gain of said amplifiers in accordance with the received strengths of a plurality of signals, said controlling means being adapted to receive a multi-level signal having portions respectively representing the received amplitudes of corresponding ones of said plurality of signals, said controlling means comprising a third amplifier having an input and an output terminal, a current rectifier and current integrating means, said rectifier interconnecting the output terminal of said third amplifier with said integrating means and being so poled as to be reverse biased by the signal appearing at the output terminal of said third amplifier, said rectifier being adapted to conduct limited current in a reverse direction so as to energize said integrating means, means for degeneratively combining the signal developed across said integrating means with the signal applied to the input of said third amplifier, means for applying the signal developed across said integrating means to said first amplifier to vary the gain thereof, and means for applying the signal appearing at the output terminal of said third amplifier to said second amplifier to vary the gain thereof.

2. In a loran receiver including R-F and I-F amplifiers, means for automatically controlling the gain of said amplifiers in accordance with the strengths of received master and slave pulses, said controlling means being adapted to receive a multi-level signal having portions respetcively representing the received amplitudes of said master and slave pulses and operative to produce first and second gain control signals therefrom for application to said R-F and I-F amplifiers, said controlling means comprising a third amplifier having an input and an output terminal, a current rectifier, and current integrating means, said rectifier interconnecting the output terminal of said third amplifier with said integrating means and being so poled as to be reverse biased by the signal appearing at the output terminal of said third amplifier, said rectifier being adapted to conduct limited current in a reverse direction so as to energize said integrating means, means for degeneratively combining the signal developed across said integrating means with the signal applied to the input terminal of said third amplifier, means for applying the signal developed across said integrating means as said first gain control signal to said I-F amplifier, and means for applying the signal appearing at the output terminal of said third amplifier as said second gain control signal to said R-F amplifier.

3. In a loran receiver including R-F and I-F amplifiers, means for automatically controlling the gain of said amplifiers in accordance with the strengths of received master and slave pulses, said controlling means being adapted to receive a multi-level signal having discrete levels respectively representing the received amplitudes of said master and slave pulses and operative to produce first and second gain control signals therefrom for application to said R-F and I-F amplifiers, said controlling means comprising a third amplifier having an input and an output terminal, a rectifier and a capacitor, said rectifier interconnecting the output terminal of said third amplifier with said capacitor and being so poled as to be reverse biased by the signal appearing at the output terminal of said third amplifier, means for providing a high impedance current path in shunt with said rectifier whereby said capacitor is charged, means for degeneratively combining the signal developed across said capacitor with the signal applied to the input terminal of said third amplifier, means for applying the signal developed across said capacitor as said first gain control signal to said I-F amplifier, and means for applying the signal appearing at the output terminal of said third amplifier as said second gain control signal to said R-F amplifier.

4. In a receiver including first and second amplifiers, means for automatically controlling the gain of said amplifiers in accordance with the received strengths of a plurality of signals, said controlling means being adapted to receive a multi-level signal having portions respectively representing the received amplitudes of corresponding ones of said plurality of signals, said controlling means comprising a third amplifier having an input and an output terminal, a current rectifier and current integrating means, said rectifier interconnecting the output terminal of said third amplifier with said integrating means, means for degeneratively combining the signal developed across said integrating means with the signal applied to the input of said third amplifier, means for applying the signal developed across said integrating means to said first amplifier to vary the gain thereof, and means for applying the signal appearing at the output terminal of said third amplifier to said second amplifier to vary the gain thereof.

References Cited in the file of this patent

UNITED STATES PATENTS

| | | |
|---|---|---|
| 2,244,695 | Hathaway | June 10, 1941 |
| 2,256,071 | Bruck | Sept. 16, 1941 |
| 2,315,043 | Boucke | Mar. 30, 1943 |
| 2,760,008 | Schade | Aug. 21, 1956 |
| 2,862,046 | Relis | Nov. 25, 1958 |